(12) United States Patent
Granstrand

(10) Patent No.: US 9,068,327 B2
(45) Date of Patent: Jun. 30, 2015

(54) FLOW METER FOR THE MEASURING OF FLUID VOLUMES ORIGINATING FROM A FAUCET

(76) Inventor: Oskar L. Granstrand, Stockholm (SE)

( * ) Notice: Subject to any disclaimer, the term of this patent is extended or adjusted under 35 U.S.C. 154(b) by 386 days.

(21) Appl. No.: 13/475,944

(22) Filed: May 19, 2012

(65) Prior Publication Data

US 2013/0305820 A1    Nov. 21, 2013

(51) Int. Cl.
| | | |
|---|---|---|
| G01F 23/00 | (2006.01) | |
| E03C 1/266 | (2006.01) | |
| G01F 19/00 | (2006.01) | |
| E03C 1/08 | (2006.01) | |
| G01F 5/00 | (2006.01) | |
| G01F 15/07 | (2006.01) | |
| G01F 22/00 | (2006.01) | |

(52) U.S. Cl.
CPC ... *E03C 1/08* (2013.01); *G01F 5/00* (2013.01); *G01F 15/07* (2013.01); *G01F 22/00* (2013.01)

(58) Field of Classification Search
CPC ....................................................... G01F 23/00
See application file for complete search history.

(56) References Cited

U.S. PATENT DOCUMENTS

| | | | |
|---|---|---|---|
| 3,762,440 A | 10/1973 | Bryant | |
| 4,221,335 A * | 9/1980 | Shames et al. | 239/428.5 |
| 4,225,057 A | 9/1980 | Horn | |
| 4,630,940 A | 12/1986 | Ostertag et al. | |
| 4,979,797 A | 12/1990 | Nemeth | |
| 5,171,429 A * | 12/1992 | Yasuo | 210/94 |
| 6,220,298 B1 * | 4/2001 | Wu | 137/801 |
| 6,797,156 B2 | 9/2004 | Chau | |
| 7,338,594 B2 * | 3/2008 | Lackey et al. | 210/85 |
| 7,392,552 B2 * | 7/2008 | Lu | 4/675 |
| 7,467,874 B2 * | 12/2008 | Gautschi et al. | 362/96 |
| 7,553,076 B2 * | 6/2009 | An | 374/148 |
| 7,742,883 B2 | 6/2010 | Dayton et al. | |
| 7,794,095 B2 * | 9/2010 | Gautschi et al. | 362/96 |
| 2003/0155538 A1 | 8/2003 | Siepmann | |
| 2005/0133100 A1 * | 6/2005 | Bolderheij et al. | 137/801 |

(Continued)

FOREIGN PATENT DOCUMENTS

| | | |
|---|---|---|
| EP | 1367370 A1 | 3/2003 |
| EP | 1610100 A1 | 12/2005 |

(Continued)

OTHER PUBLICATIONS

International Search Report and Written Opinion for corresponding PCT Application No. PCT/SE2013/050564, mailed Sep. 12, 2013.

*Primary Examiner* — Harshad R Patel

(57) ABSTRACT

A low-cost fluid flow meter to conveniently measure the volume of a fluid, for example water, when expelled from a faucet includes a scale with markings for predetermined volumes of a fluid. A flow divider positioned in the main path of flow is used to redirect a small portion of the fluid flow into a separate measurement compartment. The fluid level is then registered optically as a representation of the accumulated fluid flow and presented through light-guiding optics to the user. The measurement compartment is automatically emptied through a pressure activated reset mechanism, so that when fluid flow is turned off the meter is nulled. The device is installed to the outlet of a faucet and operates as a substitute to many of the common measurement sets and containers used in a household for water dosage, as well as serves as an indicator of the water consumed each time the faucet is opened.

19 Claims, 5 Drawing Sheets

(56) References Cited

U.S. PATENT DOCUMENTS

2007/0023332 A1* 2/2007 Fan ................................ 210/85
2007/0152074 A1 7/2007 Stowe et al.
2012/0318385 A1* 12/2012 Lian et al. ..................... 137/517
2013/0186496 A1* 7/2013 Hsu ............................... 137/801

FOREIGN PATENT DOCUMENTS

| FR | 2917436 A1 | 12/2008 |
| JP | 2004198376 A | 7/2004 |
| SE | 528823 C2 | 2/2007 |
| WO | 2012156435 A1 | 11/2012 |

* cited by examiner

FLOW METER FOR THE MEASURING OF FLUID VOLUMES ORIGINATING FROM A FAUCET

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

The present invention relates to fluid flow measurement. More particularly, the invention relates to a low-cost volumetric flow meter for volume measurements that can easily be mounted and used on a faucet.

A common household item is the measurement set, which are normally plastic containers of various sizes, having capacity for predefined set of volumes such as 5 ml, 15 ml, 50 ml, and 100 ml for example. Measuring a given volume with a measuring set is often a cumbersome procedure involving many steps. For example measuring 165 ml requires several refills with different containers. Moreover using any separate container for measurement purposes requires at least one hand to be free for the task, and many times both hands if water is not to be left running. Also sometimes water contamination of dry and clean containers is undesirable if other substances or foodstuffs are also to be measured at the same time.

Many cookware items have markings to show the user how much fluid is contained in them. These markings are often hard to read and the reading can be very inexact due to the resolution of the scale, the meniscus, and the cookware not being held perfectly flat with respect to the ground. Further, water cannot be added too quickly because waves and bubbles are easily formed in the cookware that can make it very hard to read off a correct value.

There exist several technologies for measuring fluid flow in general and many different types of flow meters are readily available on the open market. However, these flow meters have a number of disadvantages. Many times they are costly, bulky, require electric power or batteries, may require manual handling, and may require a professional to be installed. They cannot be readily mounted to and used on the outlet of a faucet and are often of industrial grade, and thus not designed for operation in for example a kitchen consumer environment.

In certain critical environments where hygiene is of importance, and the cost to benefit ratio of improving the hygiene needs to be carefully considered, the prior art offers few if any practicable solutions in the field of the present invention.

It is of value that technologies of conserving water and solutions that promote sensible water consumption are available at low cost and are easy to use. Simply notifying a faucet user of the consumed water amounts can significantly reduce water consumption over time. Thus, there exists a need for a device such as the one disclosed by the present invention.

SUMMARY

In accordance with an embodiment of the present invention, a volumetric fluid flow meter for the measuring of fluid volumes originating from a faucet is provided. In one embodiment, a housing includes a flow inlet port and a flow outlet port, the inlet port having a connector configured for easy fastening to the outlet of a faucet. Flow entering the inlet port subsequently passes through a main flow conduit comprising a particle filter, a pressure chamber, a flow divider and an aerator grating. The flow outlet port allows for the fluids originating from the faucet to be expelled in the same manner had there been no meter mounted.

The flow divider redirects a small fraction of the flow into a measurement compartment. The compartment has a predetermined shape that correlates it to a scale through a predetermined equation. According to an embodiment of the invention, the equation can for example be noted as $V=C*\log(s-p)*s+b$, where $f(s)=C*\log(s-p)$ is a logarithmic weighting function relating the fluid level s in the compartment to the scale. Further, a user interface includes markings and a gauge display that subsequently communicates to the user the total volume of fluid V having expelled from the meter since flow was initiated.

In one embodiment, a plurality of light guides are arranged in a vertical manner, and positioned in such a way that light exiting the light guides are either internally reflected or refracted by a vertically extending prismatic section of the measurement compartment. Fluid residing in the compartment will alter the index of refraction that the light paths are subject to. The light guides have their other ends terminated in the gauge display, which subsequently is able to produce an impression of the fluid level, ultimately functioning as the meter reading.

The pressure chamber connects to the flow divider and vertically elongates when pressure builds up inside. A sealing plate is connected to the extending body of the flow divider. When pressure is high, the sealing plate slides in front of a discharge hole at the bottom of the measurement compartment. When the fluid flow is shut off, the sealing plate retracts and any fluid present in the compartment is drained, effectively resetting the meter.

BRIEF DESCRIPTION OF THE DRAWINGS

An exemplary embodiment of the present invention is illustrated in the accompanying drawings, in which.

DETAILED DESCRIPTION

Figure 1:
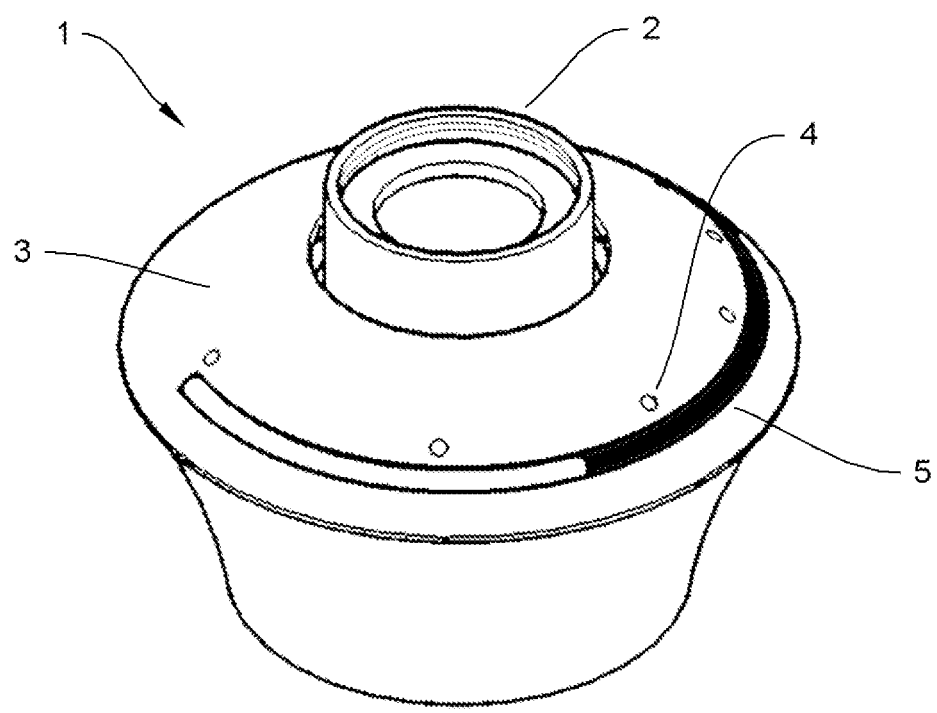
FIG. 1 illustrates a fluid meter with a scale in perspective, according to an embodiment of the invention.

A low-cost, simple to install and use flow metering device for measurement of the accumulated volumetric flow of a fluid when expelled from a faucet is provided. An embodiment of the invention is shown in FIG. 1. The meter 1 is mounted to a faucet orifice with a common threaded connector 2 serving as the flow inlet port. A housing top cap 3 is attached to the housing waist 27 (FIG. 2) and includes a semi-circular groove with scale markings 4 on the side, representing different predefined fluid volumes. Markings 4 could be, for example, a set of symbols for fluid ounces, cups, pints or just a numbered scale of metric deciliters. A semi-circular gauge display 5 connects to the underlying light-guides 14 (FIG. 2) in a lined array so as to display a continuous or close to continuous scale reading when the meter operates. Whenever reference to the scale is made, markings 4 and gauge display 5 is the physical manifestation thereof. The term scale referred to in a more abstract way is essentially the way the markings are spaced, what the markings are, and their relative positions to the display 5.

Figure 2:
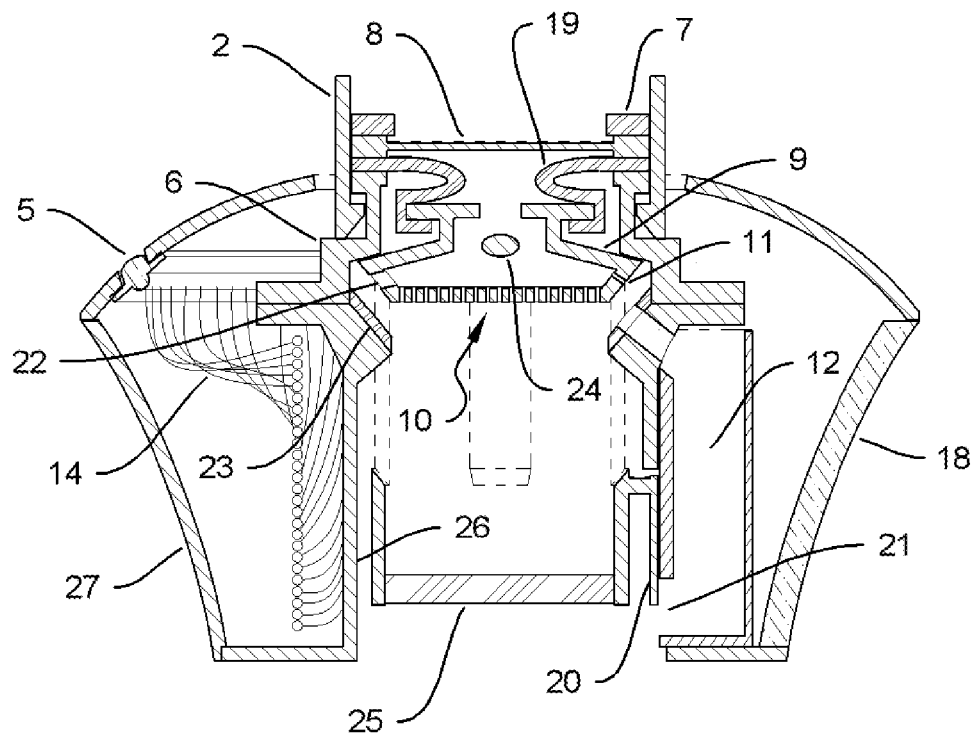
FIG. 2 illustrates a vertical cross section of the fluid meter according to FIG. 1.

Referring to FIG. 2, support cap 6 hinges on connector 2 and provides structural support and operates as an elongation of the main fluid conduit starting with connector 2, according to an embodiment of the invention. Washer 7 presses on the faucet orifice, thus sealing the conduit to the faucet. The filter 8 is a particle filter made from either a stainless steel mesh, a plastic disc with fine holes or the like, according to an embodiment of the invention. Two filters could be fitted together for improved performance, however it is important that the smallest filter grating must not allow particles with larger diameter than that of the aerator perforations 10 present in the flow divider 9.

In the disclosed embodiment flow divider 9 functions by allowing the fluid to pass through a known large number of aerator perforations 10 of the same diameter and length. Gauge aperture 11 is suitably of the similar dimensions as the perforations 10, and thus at any point in time outputs a fraction of the flow originating from the inlet port. The fluid exiting from aperture 11 is accumulated in the measurement compartment 12. The fluid level herein thus directly relates to the total volume of fluid having past divider 9 since compartment 12 was empty. Flow obturator 24 helps even out the pressure gradients inside the flow divider.

Referring to FIG. 2 the shape of the measurement compartment 12 has a horizontal cross section area that does not vary with its height, i.e. the compartment geometry does not widen nor taper with height, according to an embodiment of the invention. This warrants the fluid level herein to be related proportionally to the total volume of fluid expelled from the meter 1. Letting V be the total volume having past divider 9 during some chosen time interval and s be the fluid level in compartment 12, then the scale of the meter would naturally be designed according to the relationship $V=C*s+b$, where C is a proportionality constant with a numerical value equal to the reciprocal of the area cross sectional fraction that aperture 11 makes with the perforations 10. Simply put, if there are 100 holes in the divider 9, one of which is the aperture 11, C is equal to 100. The total volume capacity T for compartment 12 along with the value of C sets the maximum reading of the meter to $T*C$. A bias constant b can for example be used for defining if whether the scale reading should include the fluid contained in compartment 12 or not. It can also adjust for inherent offsets in the scale reading caused by different structural configurations, including misalignments.

Figure 3:
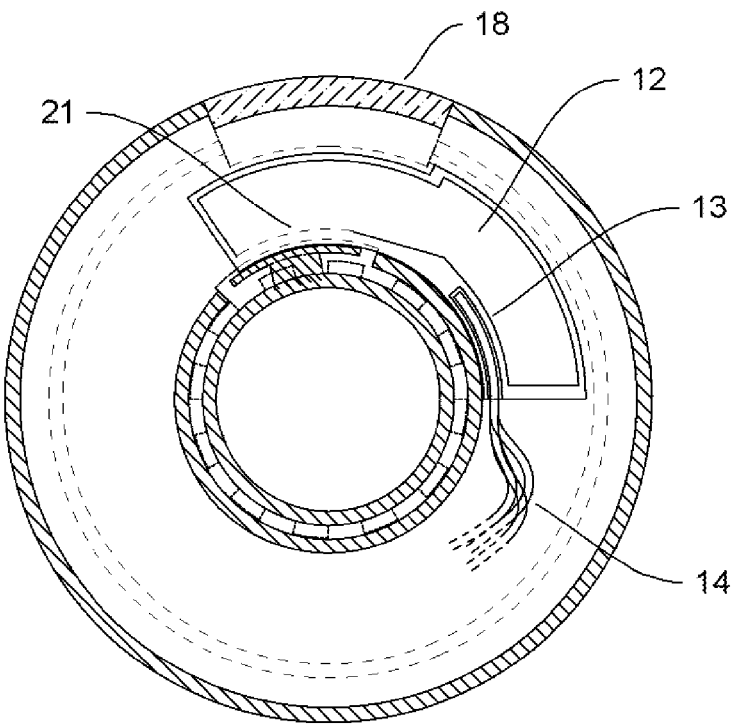
FIG. 3 illustrates a horizontal cross section of the fluid meter according to FIG. 1.

Referring to FIG. 3, a horizontal cross section of the meter shows the inner structure of compartment 12. Light guide alignment slit 13 collects the light guides 14 in a vertical stacked manner and aligns them so that the light exits from the light guides at an angle susceptible to total internal reflection inside the compartment 12, which is appropriately made from the same light-guiding material as the light guides, for example PMMA plastics. The crucial factor in determining appropriate material here is that it should be transparent and have a high difference in refractive index compared to the fluid. PMMA has a well qualifying approximate refractive index of 1.49. Water is 1.33 and air 1.00. Total internal reflection will thus occur along the path indicated in FIG. 4 by arrow 16 when air is the medium present inside compartment 12. Again referring to FIG. 4, the slanted boundary 15 should be designed so that its angle relative incoming light is slightly below the critical angle required for total internal reflection, when air is the outside medium. However it should also be sufficiently large for light to pass through when the outside medium is not air but a fluid, such as water. This criterion can be met if the outside medium has a refractive index greater than air, such as water. The light path then approximately becomes that of arrow 17. Exact calculations can be made with Snell's law of refraction. Concluding from this the fluid level inside compartment 12 will cause the proportion of light guides below this level to receive light from the light intake 18 (probably best shown in FIG. 3). The proportion of light guides above the fluid level will receive little or no light due to internal total reflection. Referring to FIG. 2, having the light guides 14 terminated at their other ends in a lined up manner at the gauge display 5, the end result will be an impression of the fluid level residing inside the display 5. The center support structure 26 and housing waist 27 should favorably have a dark and light absorbent surface, for a high display contrast that is not polluted by stray light.

Figure 4:
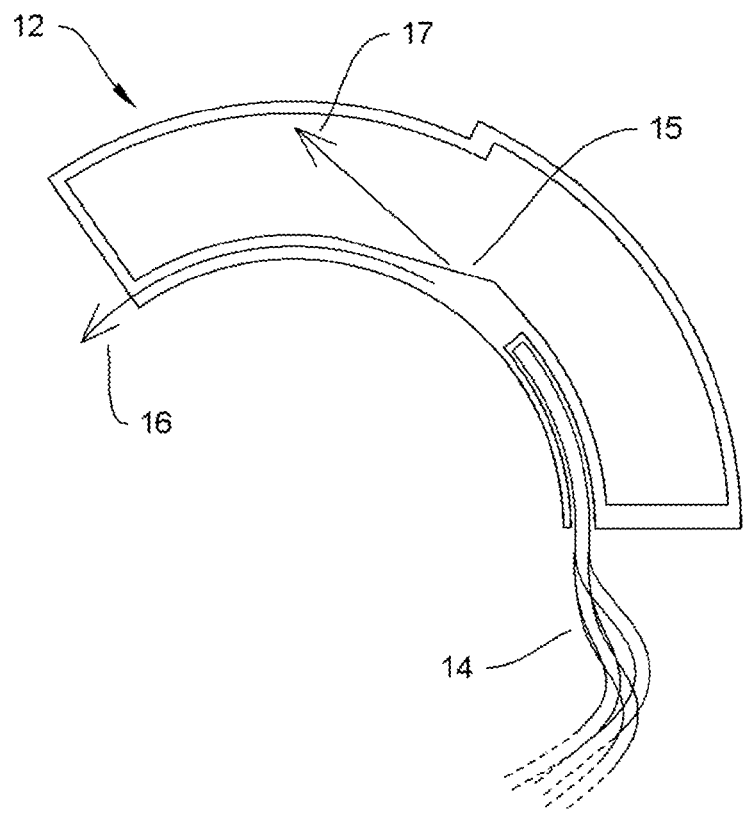
FIG. 4 illustrates a top view enlargement of the measurement compartment according to FIG. 1; arrows indicate two main possible light paths.

A hydrophilic coating, or anti-fog treatment, of the interior of compartment 12 is effectively used to minimize surface tension in order to eliminate droplet contamination on the walls thereof. As illustrated in FIG. 4, the horizontal cross section areas of compartment 12 should be distributed equally around boundary 15 so that the moment of inertia is minimized, according to an embodiment of the invention. The center of gravity should ideally coincide with the reflection-refraction point for all fluid levels. This makes the meter able to operate in a tilted position without giving an erroneous reading.

Referring to FIG. 3, light intake 18 is in its simplest configuration a translucent or transparent pane that lets ambient light into the meter. It should however have some kind of light focusing properties for improved contrast of the display 5. Its intrinsic meniscus shape helps focusing the light, but some kind of Fresnel grating on its surface should be opted for, according to an embodiment of the invention.

Figure 6:
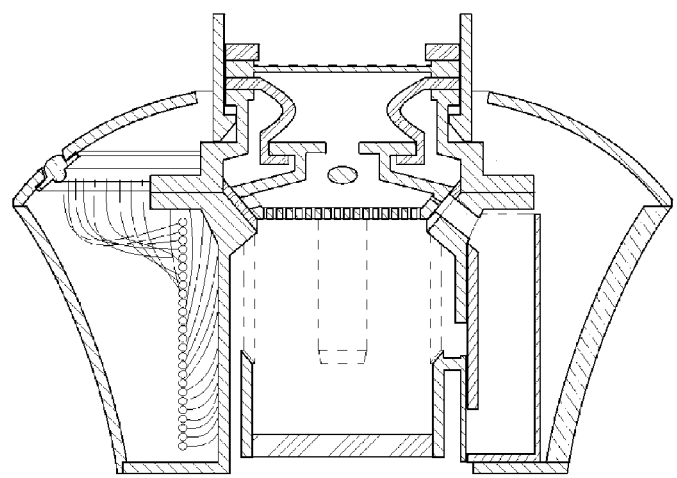
FIG. 6 illustrates a vertical cross section of the fluid meter according to FIG. 1, when the pressure chamber is in its expanded alternate state.
Figure 7:
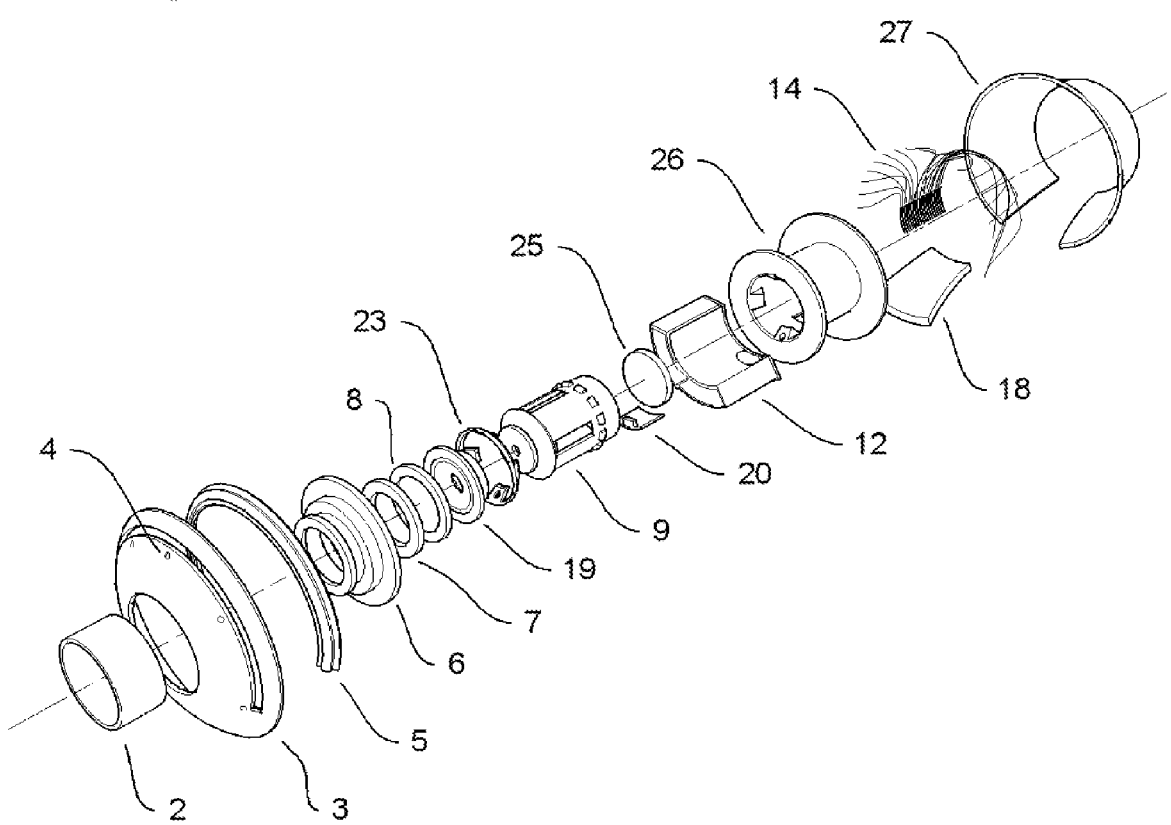
FIG. 7 illustrates an exploded view of the meter according to FIG. 1.
Figure 8:
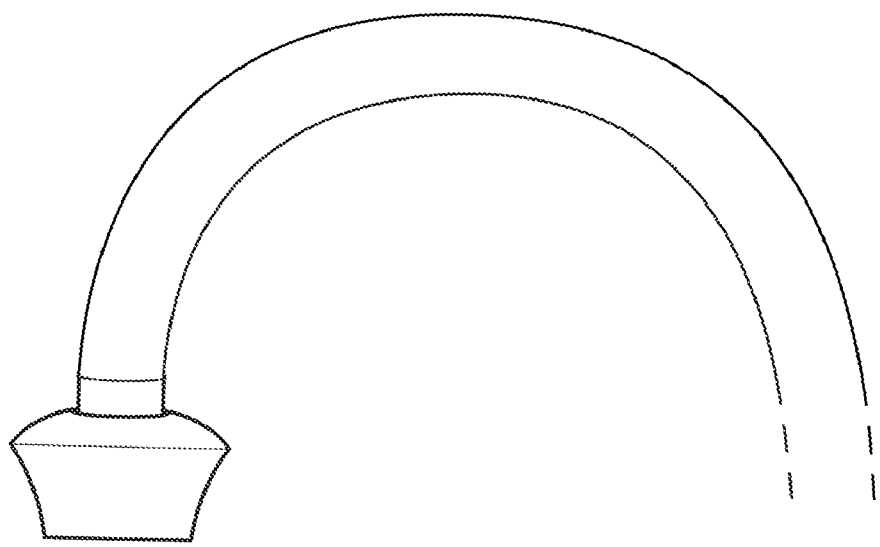
FIG. 8 illustrates a view of a meter in a using condition operating on a faucet, according to an embodiment of the invention.

Referring to FIG. 2, pressure chamber 19 is made from an elastic material such as rubber. It is structured to effectively function as a venturi tube, where pressure decreases with fluid propulsion. The constriction of fluid flow causes a pressure build-up inside the chamber that makes it expand and vertically elongate. This causes flow divider 9 to be pushed downwards along the center support structure 26. The vertically extending body of divider 9 has a sealing plate 20 at the bottom aligned to seal off a discharge hole 21 in compartment 12, when the divider 9 is pushed down, and the meter is in its alternate operating state. This situation is shown in FIG. 6. Shutting fluid flow off in this state causes the chamber 19 to contract, pulling divider 9 back to its original position of FIG. 2. As a consequence plate 20 is retracted from hole 21 and any fluid contained in compartment 12 is then drained. This results in the meter being automatically reset without any manual involvement. The drainage of fluid is rather quick and the volumes are small, so there will be little or no actual evidence of this drainage for the user. The fluid expelled from hole 21 is largely mixed with the remnant flow present in the meter for a short time after the shut off.

Pressure relief hole 22, shown in FIG. 2 provides another exit for the flow inside divider 9, but only when chamber 19 is not in its expanded state, and hole 22 is not shut of by sealant 23. The hole is dimensioned appropriately for a positive feedback loop to occur when proximity to sealant 23 is increased. When this takes place the pressure inside chamber 19 experiences a boost so that the alternate operating state of the meter becomes more rigid and is faster stabilized. In addition, when the contraction of chamber 19 occurs, it is more quick and definite once the critical pressure threshold necessary to withhold the expanded state has passed.

Figure 5A:
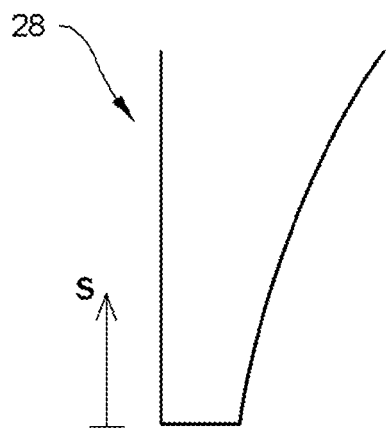
FIGS. 5A and 5B illustrate vertical cross sections of other configurations for the measurement compartment, according to an embodiment of the invention.

In an alternative embodiment, referring to FIG. 5A, the measurement compartment 12 is replaced by another measurement compartment 28, having a logarithmic vertical cross section shown in the figure. The geometry is such that its horizontal cross section area grows logarithmically with its height. The advantage of using such a compartment is foremost that the scale reading relative error becomes constant. Hence, a greater precision can be achieved at low measuring volumes, and the range of measurements can be made larger. The scale in this embodiment would effectively be designed according to the relationship $V=C*\log(s-p)*s+b$, the phase adjustment constant p being chosen to make the compartment 28 align with the housing waist 27 (FIG. 2) in an optimal way, in order to make the meter as small as possible.

Figure 5B:
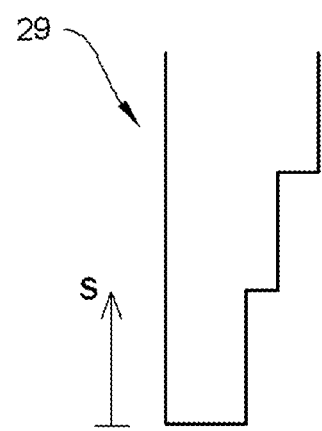

In another embodiment, referring to FIG. 5B, the measurement compartment 12 is replaced by another measurement compartment 29 having a step function vertical cross section as shown in the figure. The geometry is such that its horizontal cross section area grows step-wise. Consequently the scale conversion can be stated as $V=C*\{step\ function\}*s+b$. The advantage of using such a compartment is foremost that of achieving easily discernable discrete intervals of precision of the meter. As a result, the meter can be designed for maximal scale readability around common volumes of measurement, allowing for a greater total measurement range, and allow for more coarse materials used in manufacturing.

In another embodiment, the light guides could be configured so that only a handful discrete measuring steps are visible on the meter scale. This would lower manufacturing costs.

In another embodiment, referring to FIG. 4, at least one deflecting prism could be located in the interior of compartment 12 instead of the slanted boundary 15. In this embodiment, light beams reaching the prism are deflected either towards the light intake 18 (FIG. 3) or away from it, or reflected back to the display 5 (FIG. 1) through internal reflection or refraction or a combination of both.

In another embodiment the scale shown in FIG. 1 could be configured for a multitude of different usage scenarios, domestic or industrial. For example only numbers, letters, symbols or any combination thereof could be printed on the top cap 3. Removable top caps could furthermore be provided with the meter so that, for example, a top cap suitable for measuring certain predefined volumes used in certain baking situations can be fitted. Top caps may also display different units of measurement, such as metric or US customary units.

In another embodiment, referring to FIG. 2, the pressure chamber 19 could be omitted or made by a slack material. To reset the meter the user would need to manually exert force, either directly or through a reset button, to empty compartment 12 and reset the meter. The user interface would in this embodiment naturally consist of a scale and a reset button, or other manually controllable lever connected to the sealing plate 20.

In another embodiment the light intake is omitted, or coated with a reflecting surface.

In another embodiment a light guiding material having the same basic light guiding physical properties as an array of individual light guides is used. That is, the material should not let bundles of light rays entering the material at different positions to exit the material at the same position.

It will be understood that the description of how the optics of the meter works has been considering only a few of many possible directions for the light beams, and that the end functionality of the meter is compliant with many other directions as well. For illustrative purposes, the direction of light that best describes the features of the optics has been used.

Mounting the meter and having it ready for operation requires only two simple steps. Firstly the unscrewing of the aerator often present on the faucet, and secondly the attaching of the meter in its place.

The meter having been described herein is thus an advantageous solution for any situation requiring fast, easy measurements and dispensing of fluid volumes originating from a faucet. It directly saves water or other fluids, by limiting spill, or flow going directly down the sink that can happen between filling up measurement containers, or when one hand cannot be actively turning on or off the fluid flow.

Wherever awareness and concern over contamination (bacteria, toxins, hazardous waste etc.) of utensils is high, a low-cost, easy to use and install fluid flow meter as the one disclosed can provide a viable option in improving the hygiene. Risk of infectious disease spreading is lessened since the meter requires no manual handling.

The meter also serves as an indication not to keep water running, as well as raising user awareness of overall water consumption. It is not costly to manufacture, it is easy to install and use and can be fitted in a small housing without any other support than its inlet port connector 2. It speeds up the measuring and dispensing process of fluids compared to using separate measurement containers. Automatic resetting allows for seamless operation; no extra step other than reading of the scale is necessary to utilize the meter.

It will be understood that the embodiments of the present invention which have been described herein are merely illustrative of the principles behind it. Numerous modifications may be made by those skilled in the art without departing from the true spirit and scope of the invention.

What is claimed is:

1. A volumetric fluid flow meter for measuring the accumulated flow, comprising:
    a housing including a flow inlet port having a connector configured for fastening to a faucet outlet;
    a flow divider through which the fluid originating from the faucet outlet flows, having a predetermined fraction of the fluid redirected into a measurement compartment that is substantially enclosed by said housing;
    wherein said measurement compartment forming a container for fluid disposed therein and having a predetermined geometry, so as to provide a representation of the total volume V of fluid having flowed past said flow divider during a predetermined time interval through the relation $V=f(s)*s+b$, where s represents the fluid level of the fluid contained in said measurement compartment, b is a bias constant and f(s) comprises one of a simple proportionality constant and an arbitrary weighting function, derived from the geometry of said measurement compartment and said flow divider; and
    a flow outlet port configured to provide an outlet for fluids originating from the faucet.

2. The volumetric fluid flow meter according to claim 1, further comprising a user interface attached to said housing.

3. The volumetric fluid flow meter according to claim 2, wherein said user interface includes a scale with markings for predetermined fluid volumes.

4. The volumetric fluid flow meter according to claim 3, wherein said markings comprise at least one of: numbers, letters and symbols.

5. The volumetric fluid flow meter according to claim 2, wherein said weighting function is either one of: a constant function; a logarithmic function; a step function.

6. The volumetric fluid flow meter according to claim 1, further comprising a light guiding member attached to said housing configured to visually communicate the fluid level of said measurement compartment, whereby the fluid level can be more easily read off.

7. The volumetric fluid flow meter according to claim 6, wherein said light guiding member comprises a plurality of light guides.

8. The volumetric fluid flow meter according to claim 7, wherein said plurality of light guides are made of transparent PMMA plastics.

9. The volumetric fluid flow meter according to claim 6, wherein said light guiding member and measurement compartment are configured to refract or reflect traversing light in a substantially different direction depending on the fluid level in said measurement compartment, whereby readability of the fluid level is further improved.

10. The volumetric fluid flow meter according to claim 9, wherein said measurement compartment is at least partly composed of a transparent material with a refractive index other than that of the contained fluid therein or the surrounding air or gas, so as to allow for total internal reflection at the refractive boundary between said measurement compartment and the contained fluid therein or the surrounding air or gas, whereby readability of the fluid level is further improved.

11. The volumetric fluid flow meter according to claim 10, wherein said transparent material comprises at least one deflecting prism.

12. The volumetric fluid flow meter according to claim 10, where the refraction or reflection occurs at the approximate center of gravity for the horizontal cross sections of said measurement compartment, whereby the fluid level is not unduly biased because of said flow meter operating at a tilted position with respect to the ground.

13. The volumetric fluid flow meter according to claim 6, wherein the housing has at least one translucent or transparent opening functioning as a light-intake, so as to provide for outside light the possibility to enter said flow meter and escape through said light guiding member, whereby readability of the fluid level is further improved.

14. The volumetric fluid flow meter according to claim 13, further comprising at least one lens placed in the optical path between said light-intake and said light guiding member, so as to allow for a larger flux of light to pass into said light guiding member.

15. The volumetric fluid flow meter according to claim 1, further including a reset mechanism comprising a pressure chamber being able to change its shape in relation to the exerted pressure of the fluid flowing through said pressure chamber, so as to directly or indirectly being able to obstruct or retract from an opening in said measurement compartment, whereby the fluid therein is contained or drained, giving said fluid flow meter the ability to automatically null itself after fluid flow has been shut off.

16. The volumetric fluid flow meter according to claim 15, wherein said pressure chamber is an elastic conduit having an inlet and an outlet, said inlet diameter being greater than said outlet diameter, so as to cause a flow activated pressure build-up, resulting in expansion of said pressure chamber.

17. The volumetric fluid flow meter according to claim 16, further including at least one pressure relief hole configured to provide a positive feedback loop for the pressure build-up inside said pressure chamber, whereby the expansion of said pressure chamber is more agile and less affected by fluctuations in the fluid flow.

18. The volumetric fluid flow meter according to claim 1, wherein the interior of said measurement compartment is anti-fog treated, so as to minimize the surface tension of the contained fluid therein, whereby more precise measurements can be made, droplet contamination is eliminated, and fluid discharge is more effective.

19. A volumetric water flow meter, comprising:
a housing including a flow inlet port having a connector configured for fastening to a water faucet outlet;
a flow outlet port, connected to said housing and configured to provide an outlet for water originating from the faucet;
a flow divider for redirecting a predetermined fraction of the water flow originating from said inlet port to a measurement compartment located inside said housing;
said measurement compartment having a shape derived from some predetermined equation relating a water level to a scale, so as to let a display inform a user of the integrated water flow over time, whereby the total volume amount of water having expelled from said volumetric water flow meter since water flow was initiated can be registered;
wherein said scale includes a plurality of markings representing different predetermined water volumes;
light guiding means in communication with said measurement compartment for displaying said water level of said measurement compartment on said scale; and pressure activated automatic resetting means for enabling said volumetric water flow meter to reset itself when water flow is turned off.

* * * * *